Dec. 12, 1933.  A. J. MOTTLAU  1,938,605

VARIABLE SPEED TRANSMISSION

Filed Jan. 7, 1932  8 Sheets-Sheet 1

INVENTOR.
August J. Mottlau
BY
ATTORNEYS.

Dec. 12, 1933.  A. J. MOTTLAU  1,938,605
VARIABLE SPEED TRANSMISSION
Filed Jan. 7, 1932  8 Sheets-Sheet 2

INVENTOR.
August J. Mottlau
BY
ATTORNEYS.

Dec. 12, 1933.  A. J. MOTTLAU  1,938,605
VARIABLE SPEED TRANSMISSION
Filed Jan. 7, 1932   8 Sheets-Sheet 6

INVENTOR.
August J. Mottlau
BY
ATTORNEYS.

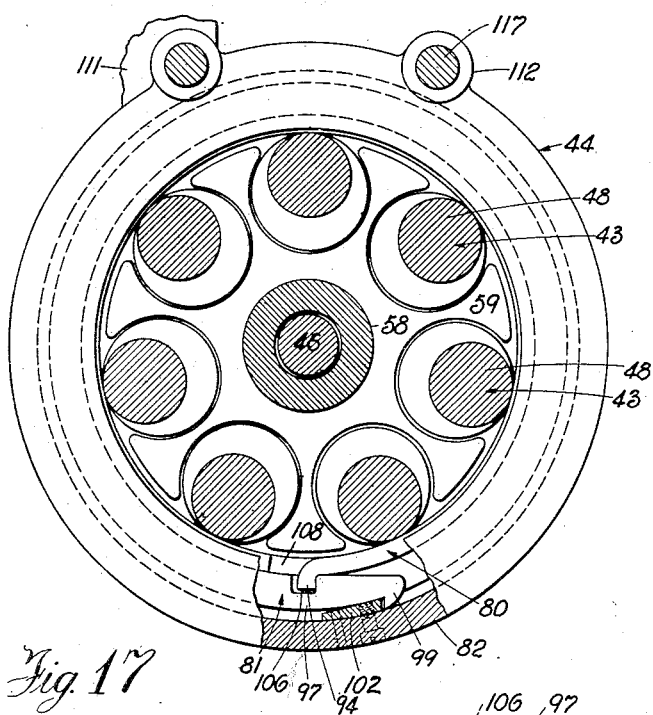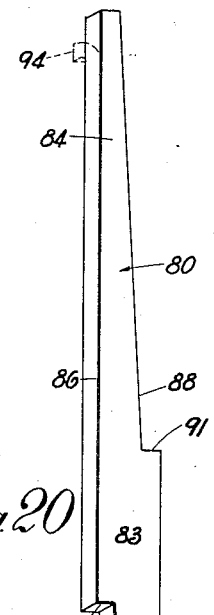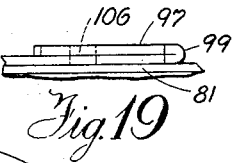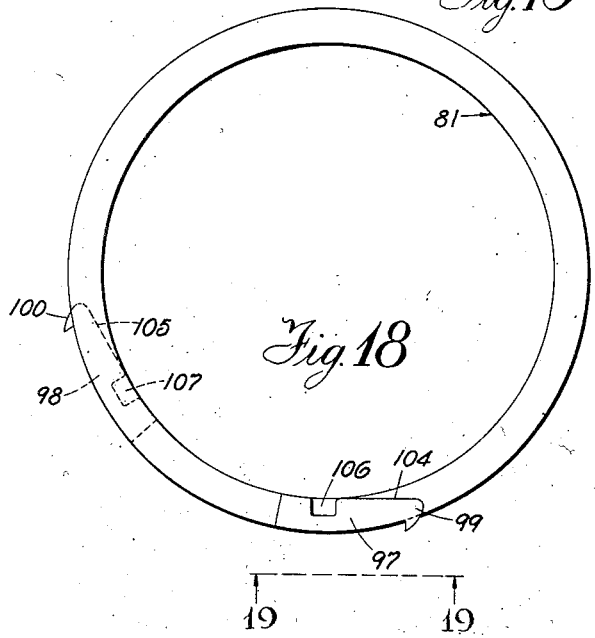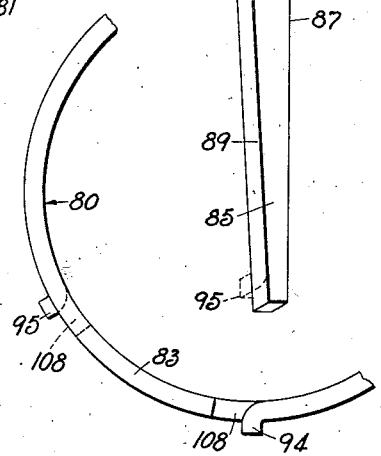

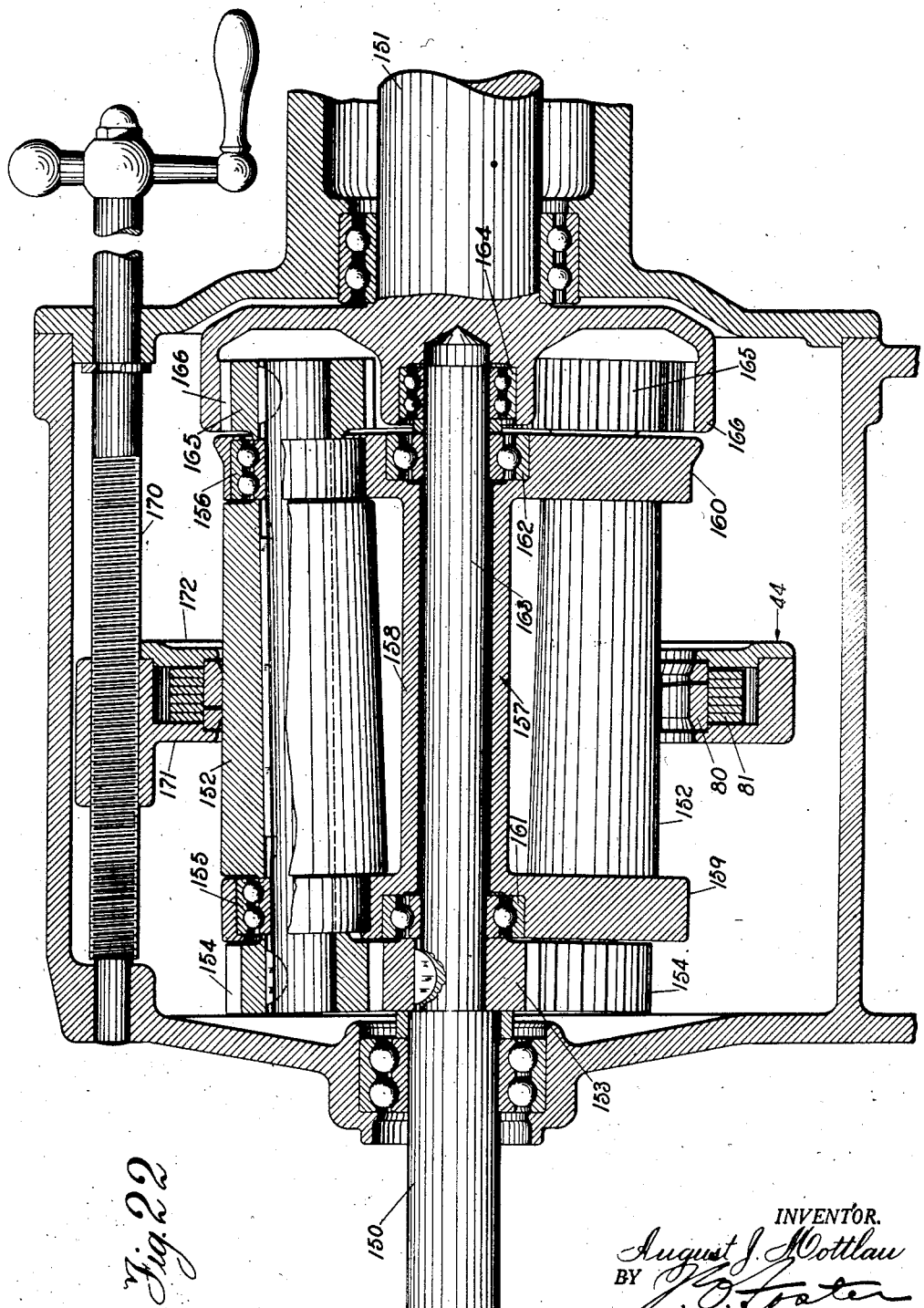

Patented Dec. 12, 1933

1,938,605

UNITED STATES PATENT OFFICE 1,938,605

VARIABLE SPEED TRANSMISSION

August J. Mottlau, Pittsburgh, Pa.

Application January 7, 1932. Serial No. 585,303

9 Claims. (Cl. 74—34)

This invention relates to power transmitting devices and particularly to a variable speed transmission.

One of the problems confronting the mechanical industry has been, and still is, to transmit power from a drive shaft rotating at a relatively fixed speed, to a driven shaft which it is desired to have driven at various speeds by that power. Many devices have been proposed, and some have been manufactured, to transmit power from a drive shaft rotated at a relatively fixed speed, to driven shafts to be rotated at different speeds that may be desired, both hydraulically and mechanically. This invention is directed to the transmission of power mechanically, and is intended to provide a device that does not have the disadvantages found in the transmissions at present on the market, while at the same time providing all the advantages of simplicity, compactness and efficiency of fixed-ratio transmissions.

The primary object of this invention, therefore, is to provide a simple efficient transmission for receiving power at one speed, and translating it, and transmitting the power to a driven shaft and to rotate the latter at another speed.

Another object of this invention is to provide a variable speed transmission in which the drive shaft and the driven shaft are co-axially aligned.

Another object of the invention is to provide a variable speed transmission in which a single control member may control both the ratio of speed, and the direction of rotation of the driven shaft with respect to the drive shaft.

Another object of the invention is to provide a variable speed transmission that shall have no reciprocating parts, but in which all moving elements shall have rotary motion.

In the variable speed transmission which I have developed I provide a plurality of elongated similarly tapered rollers disposed in planetary fashion around the central axis of the transmission and arranged to be rotated by engagement at one end with an element on the drive shaft. The rollers are supported at their ends in a suitable cage or spacing structure which serves to keep the rollers properly spaced and aligned.

The important feature about the disposition of the rollers is that their respective axes are inclined to the central axis of the transmission at such an angle that the outer longitudinal surface edges are all parallel to the central axis and also to each other. The outer edges of the rollers are all therefore disposed in a cylindrical plane co-axial with the central axis of the transmission.

The actuation of the rollers by the driving means on the drive shaft causes the rollers to rotate about their respective axes. In order to cause the rollers when so rotated to function as an epicyclic train, and to move in an orbital path around the central axis of the transmission, a stationary or fixed control ring is disposed to encircle and to engage all of the rollers in close surface engagement. As the rollers are caused to rotate about their respective axes, they will roll on the inner surface or circumference of the control ring and will move through their common orbital path. The speed of the orbital movement of the rollers will obviously be dependent upon the ratio of the diameter of the fixed control ring to the diameters of the rollers where engaged by the control ring. By shifting the control ring longitudinally along the rollers, this ratio between the ring diameter and the roller diameter may be gradually and infinitely varied, due to the taper of the rollers, and, as a result, the orbital speed of the rollers will be varied.

As the rollers revolve in their orbital path, the individual rotary movement of the rollers and the common revolving or planetary movement are combined and the resultant movement is transmitted to the driven element that is connected to, or arranged to be connected to, the driven shaft.

The principle of operation of this transmission is the combining of the peripheral motions of the surfaces of the rollers that have a component of purely rotary motion and a component of planetary motion. The rotary component is fixed by rotating the rollers about their respective axes at the driving speed. The planetary component is introduced by the action of the control ring on the tapered rollers as governed by the ratio of the ring diameter to the roller diameter where engaged by the ring.

The planetary movement is in a direction opposite to that of the rotary movement, and, since the planetary movement is variable, the combined or resultant movement may be gradually and selectively varied, and caused to be in either direction of rotation at the driven shaft.

The rotary and the planetary movements of the rollers are combined by a resilient helical driven ring encircling and closely engaging the small ends of the tapered rollers and free to rotate in response to the rotating movements of the respective rollers, and also to rotate with the group of rollers as a unit. This driven ring is connected to the driven shaft in any suitable manner to transmit the driving energy to it.

Where it is desired that the variable speed transmission shall be capable of driving the driven member both in a forward and in a backward direction, the small end of each roller is shaped during its machining or manufacturing operation, to have a diameter intermediate the sizes of the diameters at the two ends of the effective length of the tapered roller. With this construction the operation of the device is such that when the control ring is moved to a position where the diameter of each roller at the point of engagement with the ring is equal to the diameter of the enlarged end of the roller, the driven shaft will not be rotated or actuated, notwithstanding the fact that the rollers are both rotating about their own axes and revolving in their orbital path. Under these conditions, because the diameters of the rollers where they are engaged by the control ring and the diameters of the enlarged ends where they are engaged by the driven ring are the same, the enlarged ends of the rollers tend to roll within the encircling driving ring in just the same manner as the tapered rollers roll within the inner circumference of the control ring.

When the control ring is disposed at any other position along the rollers, the differential effect due to the difference between the diameters of the enlarged ends of the rollers and the effective diameters of the rollers where engaged by the control ring causes the rollers to actuate the driving ring in one direction or in the other, depending upon the effective diameters of the rollers where they are engaged by the control ring.

The shoe of the control ring, being helical in form, tends to strangulate or contract around the rollers and thereby prevents slipping of the rollers in the ring. This gripping action of springs or of resilient helically wound rings is well known and I utilize it to prevent slipping between the control ring and the rollers, and thereby keep the rolls in rotary synchronism.

The inner surface of the ring is cylindrical and of such diameter as to fit the several rollers initially with but slight initial pressure. As the load increases, such pressure increases to compensate.

In order that the ring itself may be relatively resilient it is preferably made light in weight. In order to provide the requisite strength, however, the ring is backed up or surrounded by a helical spring that is wound in the opposite direction. Tightening action of the shoe induces similar tightening action of the spring.

The driving ring which takes the low speed energy from the driven ends of the rollers by combining the rotary and the planetary movements is similarly constructed of a helical base ring, or shoe, and an encircling spring.

These various features are illustrated and described in detail in connection with two forms of variable speed transmissions, embodying the principles of this invention, that are illustrated in the accompanying drawings, in which Figure 1 is a schematic side view of a planetary roller assembly to assist in illustrating and explaining the principle of the operation of the variable transmission;

Figure 17 is a transverse sectional view of the transmission, showing the side elevational view of the control ring, with parts broken away to show the relationship between the parts thereof;

Figure 18 is a side elevational view of the helical spring of the control ring;

Figure 19 is an edge view of the terminal of the spring in Figure 18;

Figure 20 is a perspective view of the helical shoe of the control ring, as developed;

Figure 21 is a side elevational view of the shoe in Figure 20 in its operating form with its ends turned outwardly;

Figure 22 is a side sectional view of another modification embodying the principles of this invention and employing gears at the drive and at the driven ends.

In order that the operation of the transmission may be more easily and more readily understood, the operation of the systems illustrated in Figures 1 to 7 inclusive, will be first explained before proceeding to a description of the construction and operation of the variable speed transmission embodying the principles of this invention, as illustrated in the other figures.

Figure 1:
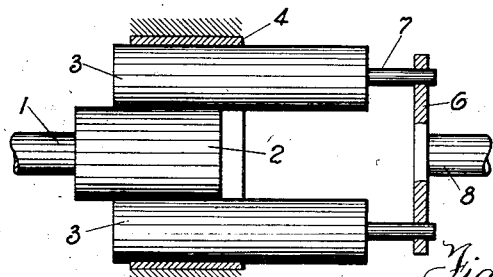

Referring now to Figure 1, the planetary roller assembly will be seen to comprise a drive shaft 1 driving a central roller 2 about which a plurality of planetary or driven rollers 3 are symmetrically and equidistantly spaced, all of the rollers being encircled and closely engaged by a fixed ring or casing 4.

Figure 2:
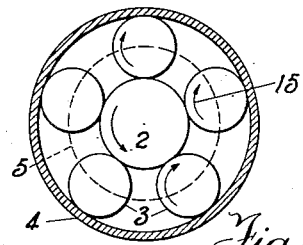
Figure 2 is a schematic view of a planetary roller assembly as shown in Figure 1, to illustrate the movements of the various rollers and their surfaces.

As is illustrated schematically in Figure 2, the operation of the assembly in Figure 1 is such that when the drive shaft 1 and its roller 2 rotate in a counter-clockwise direction, the planetary rollers 3 will all be caused to rotate in a clockwise direction and to roll along the inner surface of the fixed ring or casing 4. As the planetary rollers 3 roll along the inner circumference of the fixed ring or casing 4, the centers or axes of the individual rollers traverse a circular path or orbit, as indicated by the dotted line 5, at a speed that is a function of the diameters of the driving roller 2 and of the driven rollers 3. If, now, this planetary or orbital movement of the several rollers is harnessed so that it may be properly utilized as a driving force, a speed reduction will have been obtained from that of the drive shaft 1. This speed reduction will be constant and fixed, as a function of the various diameters.

For the sake of simplicity, an arrangement for harnessing the orbital movements of the planetary rollers 3 is illustrated as consisting of a spider bracket 6 having an arm extended to each planetary roller and disposed to be actuated in accordance with the orbital movement of the rollers 3. This particular detail of construction is not illustrated since it will be obvious to those skilled in the art that the driving connection may be made in any one of several manners, as, for example, by having a trunnion extension 7 on each roller engaging a corresponding slot in the spider 6. The spider 6 may then be suitably connected in any desired manner to the driven shaft 8 which will be driven at a speed slower than the drive shaft 1 according to the speed ratio established by the relative diameters of the drive roller 2 and of the planetary or driven rollers 3.

In the several side views of the various assemblies, I have illustrated the disposition of the planetary rollers as being diametrically opposite on the driving roller, for simplicity. Actually I use an odd number of rollers and consider it preferable to do so.

Figure 3:
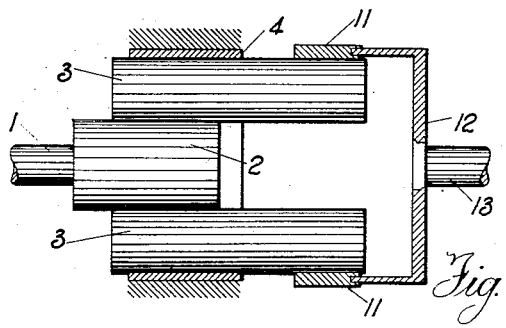
Figure 3 is a schematic view of a planetary roller assembly similar to that shown in Figure 1 with a ring encircling and engaging extended portions of the rollers.

Proceeding now to Figure 3, we will consider the driving effects of the peripheral surfaces of the planetary rollers, such as shown in the assembly of Figure 1, as distinguished from the axial driving effects of the planetary rollers bodily as units due to their orbital movements.

In Figure 3 the assembly will be considered to comprise the same elements as shown in Figure 1, including the drive shaft 1, the central drive roller 2, the planetary or driven rollers 3 and the fixed ring or casing 4 within which the rollers shall roll. In this arrangement in Figure 3, the planetary rollers 3 are illustrated as being longer, or as being provided with extensions of the same diameter. For convenience, the parts of the rollers engaging the drive roller 2 will be referred to as the primary sections of the rollers, and the extensions will be referred to as the secondary sections.

If, for the moment, we will refer back again to Figure 2 and consider the action between the central drive roller 2 and any one of the planetary or driven rollers 3, it will be seen that the turning force of the drive roller 2 is applied tangentially at the peripheral surface of the roller 3 in such manner that this tangential turning force tends to turn the planetary roller 3 about its point of engagement with the fixed ring or casing 4 as a center. As the rolling action of the planetary rollers proceeds, the reaction pressure between the planetary rollers and the fixed ring 4, in each case, may be considered to be substantially normal to the surface of the casing 4 at the point of contact between the roller and the casing, and in such manner that the reaction force is in the direction of the line passing through the center of the roller and the point of contact between the roller and the casing 4.

This seems to explain the fact that a floating ring 11 in Figure 3, having the same internal diameter as the fixed ring 4 and encircling the extensions or secondary sections, will remain stationary, notwithstanding the rolling movement of the planetary rollers 3 within the floating ring 11. If the floating ring 11 is connected through suitable connecting means, illustrated schematically as a spider or bracket arm 12, to a driven shaft 13, the driven shaft 13 will not be rotated, in spite of rotary movement of the drive shaft 1 and consequent rotation and revolution of the planetary rollers 3.

Figure 4:
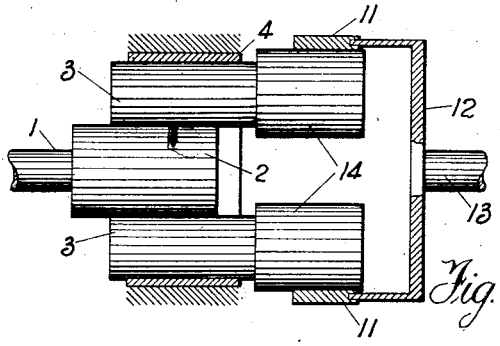
Figure 4 is a schematic view similar to that shown in Figure 3, except that the extensions of the rollers are of larger diameter than the sections in engagement with the drive shaft.

We proceed now to the arrangement illustrated in Figure 4, in which we find the same elements as in the first speed-reduction stage, namely, the drive shaft 1, the drive roller 2, the planetary driven rollers 3 and the fixed ring or casing 4 encircling and engaging the planetary roller 3. In this Figure 4, the extensions or secondary sections 14 of the planetary rollers 3 are shown of larger diameter than the primary sections, or those parts of the rollers that are engaged by, and driven by, the driving roller 2. A similar floating ring 11, free to rotate, encircles and engages the large secondary sections 14 of the rollers 3, and is connected by a similar spider and arrangement of arms 12 to the driven shaft 13.

Figure 5:
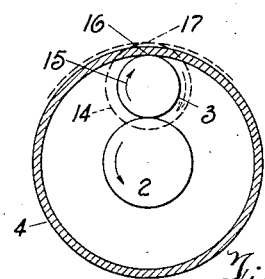
Figure 5 is a schematic view of a planetary roller assembly as shown in Figure 4, to illustrate the movements of the various rollers and their surfaces, and it shows that the outer surface of the enlarged extension moves clockwise while the roller axis and the rollers as a whole move counter-clockwise.

To explain the effects of the enlarged portions 14 of the rollers upon the floating ring 11, we will now refer to the schematic showing in Figure 5. Figure 5 shows the drive roller and only one of the planetary rollers, for the sake of simplicity. If we consider now the operation of the arrangement in Figure 5, as compared with the operation of the arrangement in Figure 2, we will observe that, whereas in Figure 2 the tangential force 15 on the inward edge surface of the roller moves around the point of contact 16 as a center, this same tangential force 15 applied to the arrangement shown in Figure 5 sets up a lever force about the point 16 as a fulcrum. The tangential force in Figure 5 tends to rotate the roller 3 about the point 16 through a moment arm or distance corresponding to the diameter of the driven, or primary section of roller 3. At the same time, however, a tangential force is established on the outer peripheral edge of the large secondary section 14 in a clockwise direction and contrary to the direction of the planetary or orbital movement of the roller 3, with respect to the central axis of the assembly, corresponding to the axis of drive roller 2.

We have now a movement, at the outer peripheral edges of the enlarged secondary sections 14, that is a function of the three diameters, namely, the diameter of the driving roller 2, the diameter of the driven roller 3 and the diameter of the enlarged secondary section 14.

If the system shown in Figure 4 is operated so that the driving roller rotates in a counter-clockwise direction, as is illustrated in Figure 5, the resultant driving force at the surface of the enlarged portions 14 will be in a clockwise direction and will tend to move or rotate the ring 11 in the clockwise direction and the ring 11 will carry with it the driven shaft 13. In the arrangement shown in Figure 4, therefore, the direction of rotation of the driven shaft 13 will be reversed from the direction of rotation of the drive shaft 2 because of the greater diameter of the secondary or enlarged portions 14 over the diameters of the primary or driving portions 3 of the planetary rollers.

Figure 6:
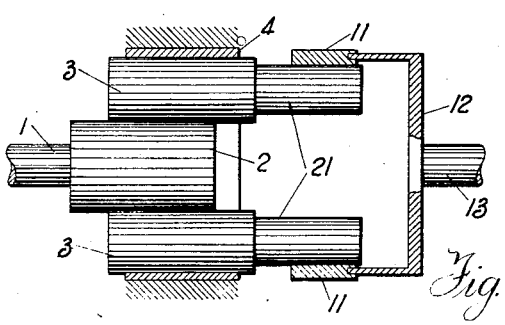
Figure 6 is a schematic view of a planetary roller assembly similar to that in Figure 3 except that the roller extensions in this case are of smaller diameter than the roller sections in engagement with the drive shaft.

The next arrangement to be considered is that illustrated in Figure 6, in which the primary system is the same, namely, the drive shaft 1, the drive roller 2 and the planetary driven rollers 3 and the stationary ring or casing 4. In this arrangement, the planetary rollers 3 are provided with extensions or secondary sections 21 of smaller diameter than the primary sections of rollers 3, and the extensions 21 are encircled and engaged by a ring 11 that is connected to the driven shaft 13 in the manner already explained in connection with the arrangement shown in Figures 3 and 4.

Figure 7:
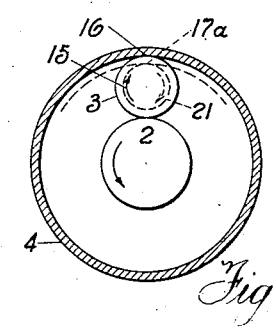
Figure 7 is a schematic end view for illustrating the arrangement of the several roller elements and also the various movements of the various surfaces of all of the elements of the assembly shown in Figure 6.

We will refer, now, to the schematic view as shown in Figure 7 for an analysis of the operation of the arrangement shown in Figure 6.

When the drive shaft 2 rotates counter-clockwise, the tangential force 15 causes the primary sections of the planetary rollers 3 to roll around on the inner circumference of the fixed ring or casing 4, and the rollers 3 revolve in the orbital path that is the locus of the centers or axes of those rollers. While the rollers 3 are rotating clockwise about their respective axes, the rollers are bodily moving in a counter-clockwise direction along their orbital path. The movement of a point on the circumference of the smaller extensions 21 on the planetary rollers, is therefore a function of the rotary motion of the rollers about their respective axes and the planetary or orbital movement of the rollers between the drive roller 2 and the casing 4.

In this arrangement, as illustrated in Figure 7, the center or axis of each roller moves through its orbital path faster than the point on the circumference on the smaller extension 21 moves backward. Consequently, the resultant movement of a point on the circumference or surface of the extension 21 moves in the same direction as the revolving roller but at a slower speed.

As an additional method of analyzing the resultant movement on a point on the peripheral surface of the extensions of the planetary rollers 3, we will consider the schematic showing in Figure 2 again. The tangential force 15 tends to move the center of the roller 3 ahead in a counter-clockwise direction around the point 16 as a center. At the same time, the point 16 on the periphery of the rollers 3 tends to move clockwise around the center of the roller. Since the radius or moment arm in each case is the same, there is no relative motion between the point 16 on the periphery of the roller and the corresponding point where it engages the inner circumference of the stationary ring 4.

If, now, we proceed again to the showing in Figure 5 and consider the same analysis of movements, we see that the center of the roller 3 moves ahead in a counter-clockwise direction about the point 16 as a center. The distance or radius arm is the radius of the planetary roller 3. On the other hand, a point 17 on the periphery of the enlarged extension 14 moves around the center of the roller 3, and, consequently, around the center of the enlarged portion 14 at the same angular velocity but at a greater surface speed due to the greater distance from the center of rotation. The reverse or backward motion of the point 17 in a clockwise direction is therefore greater than the forward or counter-clockwise movement of the axis of the roller. Consequently, where the extension or secondary section of the roller 3 is larger in diameter than the primary part of the roller 3, the floating ring 11 will be driven in a backward direction and will be caused to rotate the driven shaft 13 in the direction opposite to that of the drive shaft 1.

Reference to Figure 7 shows, by similar analysis, that a point on the small extension 21 moves backward or clockwise around its center at a slower rate of peripheral speed due to its shorter distance from the center of the roller, while the center moves forward or counter-clockwise at a greater speed because of its greater distance from the point 16 about which, as a center, the axis of the roller instantaneously moves forward.

Considering all three arrangements, namely, where the extensions are larger in diameter than, equal in diameter to, and smaller in diameter than, the primary sections of the planetary rollers that are directly driven by the drive roller 2, we note that the extensions of the rollers may be utilized to cause motion in one direction down to a point where the extensions are of the same diameter, as the primary sections, at which the motion becomes zero, and may then be utilized to reverse the direction of rotation, according to the relative diameters of the several sections of the rollers.

By utilizing this principle of construction it becomes apparent that the extensions of the rollers may be utilized to establish motion varying from a speed in a forward direction through zero to a speed in a reverse direction, limited only by practical dimensions of the rollers and of the extensions, since the speed in each direction will depend upon the relationship between the various diameters of the rollers, it will be appreciated that the machine may be designed to establish any desired forward speed and reverse speed, within reasonable mechanical limits, of course.

Figure 8:
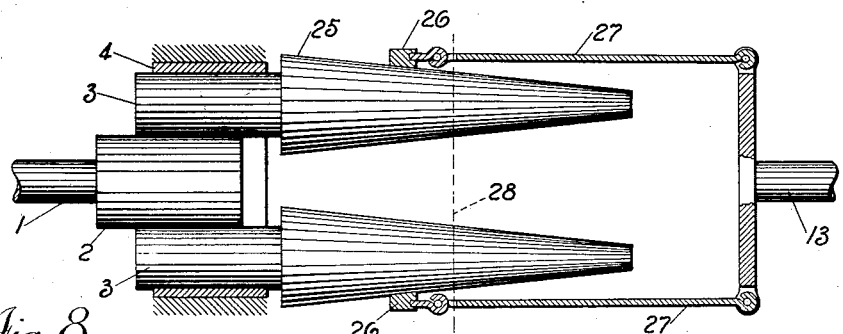
Figure 8 is a schematic view of a planetary roller assembly showing tapered roller extensions, varying from a diameter larger than the main roller to a diameter smaller than the main roller, as would be formed by combining the extensions of Figures 4 and 6 in gradually varying diameters.

Since extensions of the rollers that are larger than the rollers in diameter will cause motion in one direction, and extensions that are smaller than the roller diameters will cause motion in the opposite direction, it also becomes apparent that infinite variations of derived speed may be established by providing tapered extensions which vary in size from a diameter exceeding the diameter of the planetary rollers to a diameter that is less than the diameter of the planetary rollers, as illustrated in Figure 8.

As shown in Figure 8, the assembly comprises the drive shaft 1, the drive roller 2, the planetary roller 3 and the fixed ring 4 as in the previous figures. In order to obtain the variation of speed at the driven end, the secondary sections or extensions 25 of the planetary rollers 3 are provided in tapered form, extending from a diameter larger than the diameters of the primary sections of the planetary rollers 3 to a diameter smaller than the diameters of the primary sections of the planetary rollers 3.

For the sake of illustration, let it be assumed that the driving torque for the driven shaft 13 is derived from the surfaces of the tapered extensions 25 by means of an expansible and collapsible ring 26 which is connected by suitable pivoted arms 27 to the driven shaft 13. As the ring 26 is moved along the outer peripheral surfaces of the tapered extensions, the ring 26 will be caused to rotate in one direction so long as it engages the parts of the tapered extensions, that are larger in diameter than the diameter of the primary sections of the planetary rollers 3. When the ring engages the extensions in the zone of the line 28 at which the effective diameters of the tapered extensions will be substantially equal to the diameters of the primary sections of the rollers 3, there will be no effective rotation of the ring 26, and the driven shaft 13 will consequently be and remain stationary.
As the ring 26 is moved outwardly, beyond the zone of the line 28, the effective diameters of the tapered extensions where they are engaged by the ring 26 will be less than the diameter of the primary sections of the planetary rollers 3, and the ring 26 will therefore be caused to rotate in a reverse direction from that in which it turned when engaging the larger sections of the tapered extensions.

Thus, irrespective of the position of the driven ring 26 on the tapered extensions 25, the derived speed for driving the driven shaft 13 depends upon the relationship between the diameter of the primary section of a planetary roller 3 and the effective diameter of its extension in the plane of engagement of the ring 26. In all of the modifications illustrated in the figures so far described, the relationship between the angular velocity of each roller about its own axis, and the angular velocity of revolution of the roller in its orbital path, is constant and fixed.

Moreover, although in Figure 8 I have schematically illustrated the ring 26 to be of changeable dimensions, so that it may readily expand or contract to engage the surfaces of the tapered extension 25, such construction may suffice to describe the principle but it is unsatisfactory mechanically and it is not susceptible of actual mechanical design to operate in that manner.

In order to obtain a flexible arrangement for deriving a variable speed from a fixed speed, I provide in the preferred form of the transmission, as described in this application, a planetary roller system in which the rollers are individually angularly rotated about their respective axes, and then independently controlled to establish a planetary or orbital movement of the rollers, as a system, to drive the driven shaft at the desired speed.

Figure 9:
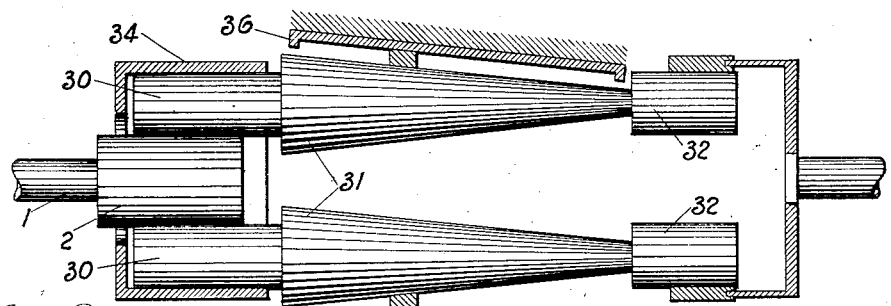
Figure 9 is a schematic view of a planetary roller assembly similar to that shown in Figure 8 except that the tapered rollers are provided with cylindrical extensions and the planetary action is controlled by a shiftable ring on the tapered sections instead of by the drive shaft against the rollers.
Figure 10:
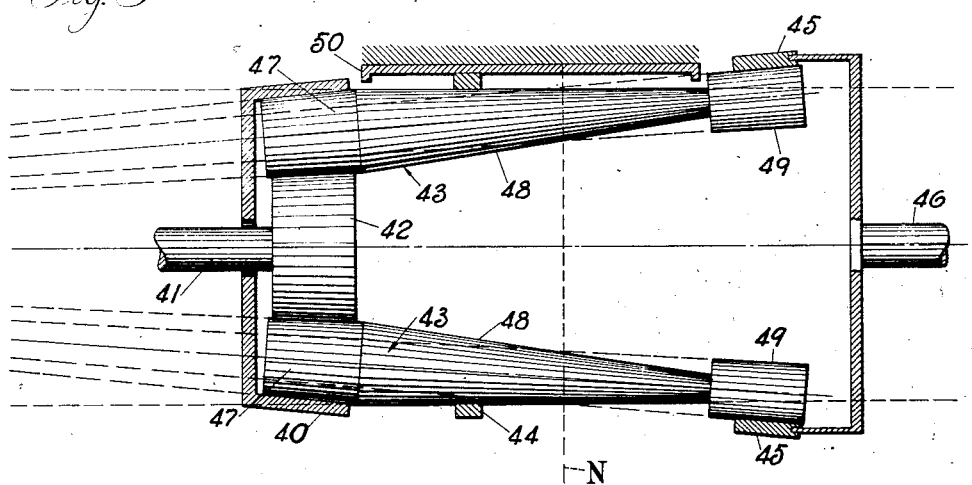
Figure 10 is a schematic view of the arrangement of the preferred structure illustrated herein and corresponds to the assembly in Figure 9 arranged in proper mechanical design.

Figures 9 and 10 schematically illustrate the arrangement and operation of this preferred system.

It will be seen that the arrangement schematically illustrated in Figure 9 is similar to that in Figure 8 except that the rollers embody three sections in order that the sections from which the driven speed is derived for the driven shaft may be cylindrical, with their sides substantially parallel to simplify the disposition of a motion-receiving ring on those sections.
This construction comprises the drive shaft 1 and the driving roller 2, as in the other figures. The rollers for transmitting motion, however, embody three different sections in this arrangement. As is illustrated, the rollers embody driving sections 30, tapered control sections 31 and driven sections 32. The driving sections 30 receive the driving energy from the drive roller 2 by engagement therewith, and the floating ring 34 is utilized merely to maintain the close constant engagement between the drive roller 2 and the driving sections 30. The ring 34 in this case is not fixed, as in Figures 1 to 7, but is free to rotate in response to the rotating movements of the driving sections 30. The entire planetary system of the rollers and the ring 34 is therefore, in this case, a floating system. In order to transmit driving torque to the driven shaft 13, however, it is necessary to establish a planetary movement of this system, which is done by a stationary element against which the rollers may be caused to roll, while maintaining close continuous surface engagement with that element. To establish this condition, I provide a shiftable control ring 35, encircling and engaging the outer surfaces of the tapered control sections 31 of the rollers. For the sake of simplicity of explanation, let us consider the ring 35 to be expansible and contractible in diameter, as may be necessary, as it is shifted back and forth along the tapered roller sections 31, although actually the ring would not be so made. As the rollers are rotated by the driving roller 12 the tapered sections 31 will be caused to rotate in the control ring 35, which will be fixed against rotation by a suitable stationary guide 36 within which the ring 35 may be shifted longitudinally of the apparatus to maintain its engagement at different points along the tapered sections.

We have now in the arrangement shown in Figure 9, a planetary system in which the rollers are individually rotated at a fixed angular speed independently of planetary movement. This action is the same as in all of the arrangements shown in the previous figures. The planetary or orbital movement of the roller system as a whole, however, is now controlled according to the location of the control ring 35.

The derived speed now is still a function of the angular speed of rotation, the planetary speed of orbital movement, and the diameters of the driving sections 32 and the diameters of the tapered sections 31 where they are engaged by the control ring 36. In this case, however, the angular velocity of rotation does not bear a fixed relation to the angular velocity of the planetary movement of the rollers as in the previous figures. The angular velocity of rotation is, of course, determined by the drive roller 2, but the angular velocity of planetary revolution is determined by the position of the control ring 25 along the tapered surfaces of the tapered sections 31.

Keeping in mind the principle of the assembly shown in Figure 9, we may now consider the schematic arrangement shown in Figure 10 which utilizes the same principles as the arrangement shown in Figure 9 but is arranged better mechanically.

The construction shown schematically in Figure 10 illustrates simply the principles of construction and the arrangement employed in a preferred form of the invention of this application.

The assembly shown in Figure 10 comprises briefly, a drive shaft 41 with which is associated a suitable driving member 42, a plurality of rollers 43 arranged in planetary fashion to be driven by the driving member 42, a control ring 44 for controlling the orbital or planetary movement of the rollers around the central axis of the assembly, a driven or power-receiving ring 45 and a driven shaft 46.

It will be observed that the rollers are arranged with their respective axes inclined at an angle to the central axis of the transmission, although the rollers are tapered symmetrically about their own respective axes. The axes of the several rollers meet at a point on the central axis which constitutes the vanishing point for the assembly. The rollers 43 embody, respectively, a short, tapered drive section 47, a relatively long tapered control section 48, and a short enlarged driven section 49 which corresponds to the roller extension 32 described in Figure 9. The angle at which the axis of each roller is inclined to the main or central axis of the assembly is determined by the taper of the central or control section 48 and corresponds to the angle of the taper with respect to the roller axis. By so disposing each individual roller, its outer longitudinal peripheral edge will be caused to be parallel to the central axis of the assembly, and the outer surface edges of all of the rollers will therefore be parallel and in a cylindrical plane. This arrangement of the tapered rollers, with their outer edges parallel, permits the movable or shiftable control ring 44 to be shifted along the rollers, easily and readily, to control the planetary or orbital movements of the rollers in response to the fixed angular speed established by the driving roller 42.

The drive sections 47 of the rollers are tapered and constitute truncated sections of cones having their vertices at the vanishing point.

The driven or extension sections 49 at the outer ends of the rollers, are also tapered at such an angle that the sections constitute truncated sections of cones having their vertices at the vanishing point.

The operation of this system will now be better understood. As motion is imparted to the drive shaft 41 and the driving member 42, the planetary rollers 43 will be caused to rotate about their respective axes at a fixed angular velocity determined by the speed of the drive shaft 41 and the ratio between the diameter of the drive member 42 and the effective diameters at the regions of engagement of the driving sections 47 of the planetary rollers. The planetary rollers are supported at both ends by suitable means (not shown in this figure, for simplicity), and would rotate freely and would constitute a freely floating system, were it not for the control ring 44. As the planetary rollers are caused to rotate, their close engagement with the control ring 44 causes the tapered control section 48 of each roller to roll along the inner circumference of the control ring 44 and thereby establishes a planetary or orbital movement of the rollers within that ring, while each roller rotates about its own axis.

The speed of the orbital movement of the rollers will be a function of the internal diameter of the control ring 44, the effective diameter of the tapered control sections 48 of the rollers, where engagement is established between the rollers and the control ring 44, and the angular rotative velocity of the rollers. Since the angular rotative velocity of the rollers is constant and the internal diameter of the ring 44 is constant, the orbital or planetary speed of the rollers in their planetary movement will be a direct function of the effective diameters of the rollers where they are engaged by the control ring 44.

So long as the control ring 44 is anywhere on the left-hand side of the dotted neutral line N, the direction of rotation of the driven ring 45 and of the driven shaft 46 will be in one direction. When the control ring engages the rollers in the region of the neutral line N, at which the effective diameters of the tapered control sections 48 correspond to the effective diameters of the tapered control sections 48 correspond to the effective diameters of the driven extensions 49, where the latter are engaged by the driven ring 45, there will be no motion induced in the driven ring 45 nor in the driven shaft 46. When the control ring 44 is moved to the right-hand side of the neutral line N, however, the driven ring 45 and the driven shaft 46 will then be rotated in the reverse direction.

By means of the arrangement illustrated in Figure 10, therefore, the movement of the control ring along the tapered sections 48 of the rollers will serve to control the speed and the direction of rotation of the driven shaft 46 according to the position at which the ring 44 is placed. It should be kept in mind that the ring 44 is not free to rotate around its axis although it may be shifted back and forth along the tapered rollers. The representation of the stationary slide 50 is intended to illustrate a construction operating so.

A confining ring 40 floats on the outer surfaces of the sections 47 of the rollers and serves to hold those sections in engagement with the driving element 42.

We may now proceed to the other figures in which the construction of two modifications of the transmission is illustrated in more detail.

Figure 11:
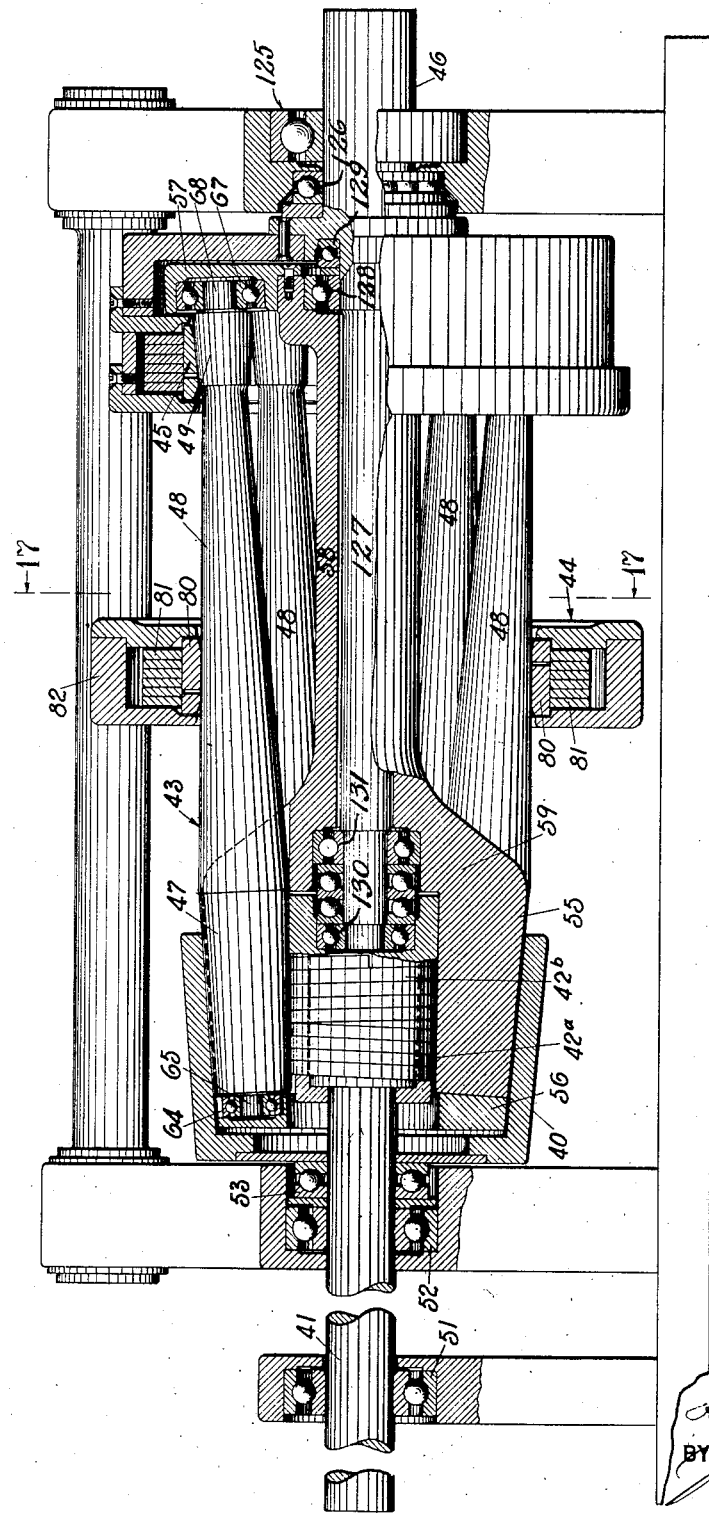
Figure 11 is a front view of the transmission, partially in elevation, and partially in section.

As is illustrated in Figure 11 which shows an open side view partially in section of the transmission employing the principles that are schematically illustrated in Figure 10, the transmission comprises the drive shaft 41, a pair of helically wound driving springs 42a and 42b mounted on, or secured to, the drive shaft 41 and functioning together as a driving element for the planetary tapered rollers 43. Each tapered roller respectively embodies the tapered driving section 47, the central control section 48 and the enlarged driven extension 49, corresponding to the elements shown in the schematic diagram of Figure 10. Power is transmitted from these driven extensions 49 through a flexible helical ring 45 to the driven shaft 46.

The drive shaft 41 is shown supported between two bearings, 51 and 52. A thrust bearing 53 mounted with the bearing 52 provides an antifriction end-thrust support for the confining cup or ring 40 which holds the rollers in close engagement with the driving springs 42a and 42b. The respective axes of the several planetary rollers are inclined with respect to the central axis of the apparatus at an angle corresponding to the angle of taper of the individual rollers, so that the outer edges of the central control sections 48 will be horizontal and parallel to the central axis and to each other. The outer edges of the rollers will all be and move in a path describing a symmetrical cylinder concentric with the central axis. The driving sections 47 of the rollers are of sufficient length to provide the necessary surface for engagement with the confining cup 40 and the driving springs 42a and 42b.

In order to support the rollers in proper alignment and relative position, a cage or spider 55 is provided, embodying a drive-end flange 56, a driven-end flange 57 and a rigid hollow connecting shaft or shank 58. The drive end of the spider is provided with radially extending wall sections or partitions 59 to impart rigidity to the spider. The spaces between the partitions accommodate the rollers. The drive-end flange 56 is secured and anchored to the spider at the ends of the partitions by suitable means such as screws 61 and pins 62. The flange 56 is provided with radial slots 63 to serve as bearing recesses for bearings 64 to support the rollers by means of small journals 65 at the drive end of each roller.

The driven-end flange 57 is secured to the other end of the spider shank and is also provided with bearing recesses 66 to accommodate bearings 67 to receive journals 68 on the driven ends of the rollers.

The disposition of the bearings in the flanges of the spider is such as to support the rollers with the roller axes inclined to meet at the vanishing point of the assembly, and with the outer edges of the rollers parallel to each other and also to the central axis of the assembly.

Reverting again to the driving end of the transmission, attention is directed to the two driving springs 42a and 42b by means of which the rollers are rotated about their own axes. The two springs are helically wound in opposite directions and are of substantially the same length so that when supported on the drive shaft their respective end thrust forces against the rollers due to their respective helical pitch will be counteracted and neutralized.

During manufacture the springs are wound so that in their normal unstressed condition their outer diameters will be somewhat greater than the operating diameters at which they will be used. They are then tightly wound upon an arbor until their external diameters are slightly larger than the operating diameter for which they are intended. The springs are then ground down to the operating diameter for which they are intended, as a result of which the outer surfaces of all of the convolutions of the springs are in substantial alignment and in the same conical plane that constitutes the locus of their operating cone of contact with the rollers. The springs are shaped to constitute truncated conical sections with a common virtual vertex at the vanishing point of the transmission to enable the springs to revolve with purely rolling motion.

When the springs are then mounted on the drive shaft and placed between the rollers, they are therefore under slight compression, thereby tending to establish good surface contact with the rollers. The floating confining cup 40 functions as an enclosing ring or casing to hold the rollers against radial displacement under the driving force of the driving springs. The cup 40 is not restricted in any way against rotating motion, but is limited against axial movement. In order to support and maintain the springs in their normal helical conditions, two outer end rests 70 and 71 are provided for the outer end convolutions of the two springs. The outer end rests constitute annular rings whose inner edge surfaces are inclined according to the pitch of the spring convolutions so that the end convolutions will seat against the end rests. An inner rest 72 is disposed between the springs and is provided with two oppositely inclined surfaces to accommodate the inner end convolutions of the two springs. All three rests are fitted over the shaft and secured thereto in any suitable manner as by a key, spline or screw.

Each rest is provided with a lug 74 fitting into a recess 75 at the end of the terminal convolution of the associated spring, so a free mechanical driving connection can be established between the rests and the springs.

With the arrangement as shown, rotation of the drive shaft in one direction will cause the inner end rest to engage the inner ends of the springs and expand them, but rotation in the opposite direction will cause the outer end rests to engage the outer ends of the springs and stress them to drive the rollers. In either case, the end thrust forces counterbalance.

Figure 12:
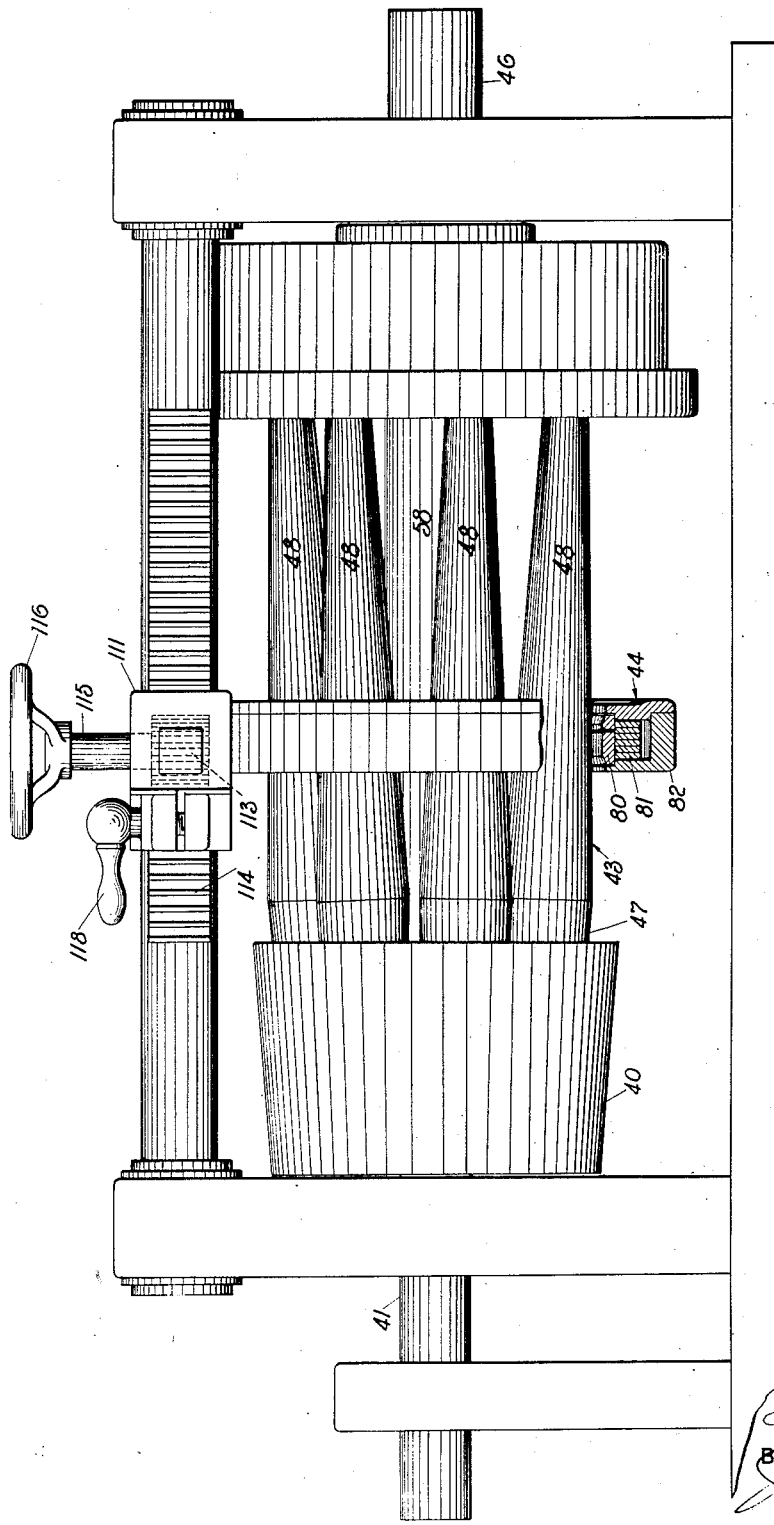
Figure 12 is a plan view of the transmission shown in Figure 11.
Figure 13:
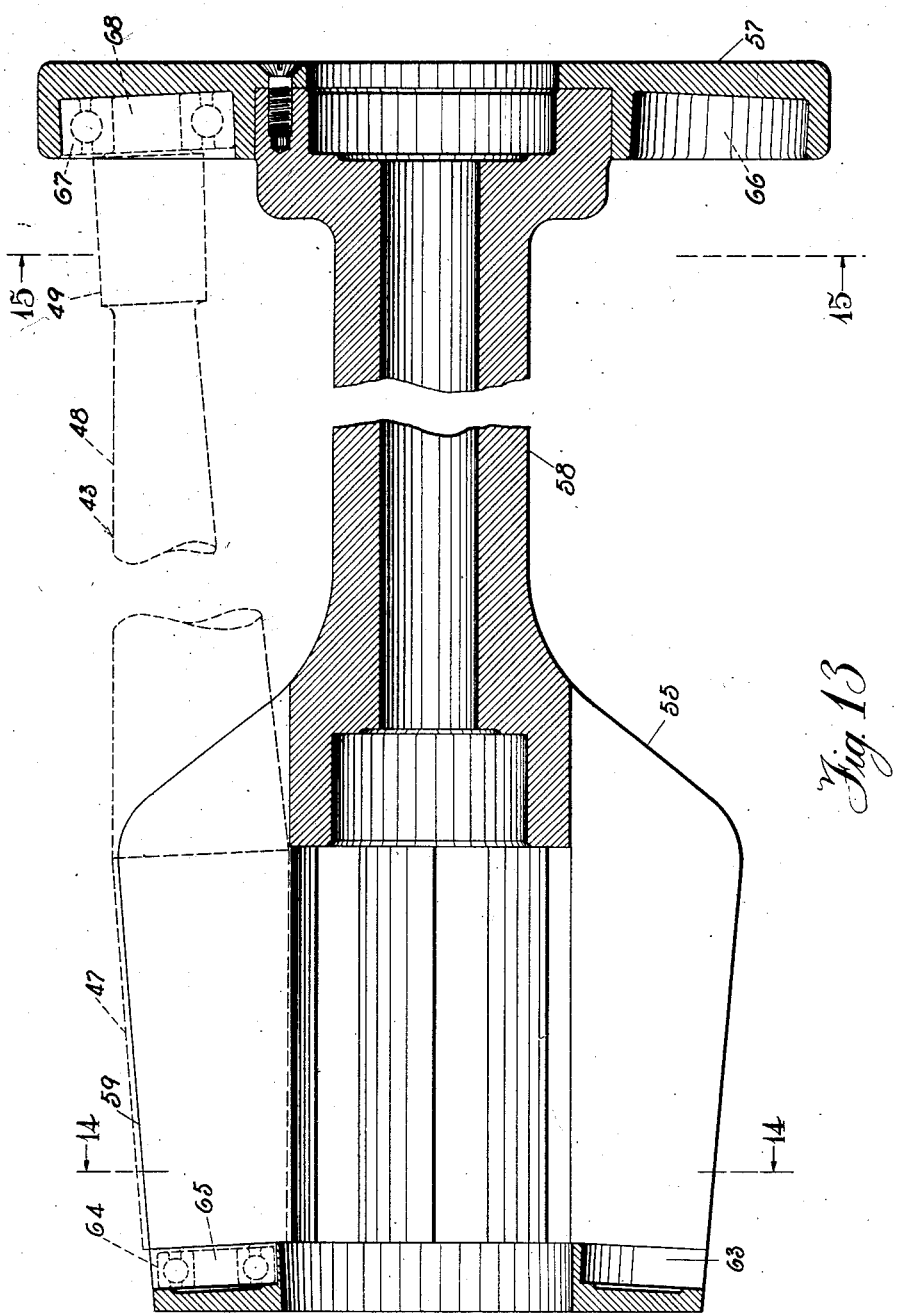
Figure 13 is a front elevational view of the spider or cage for supporting the rollers in position.
Figure 14:
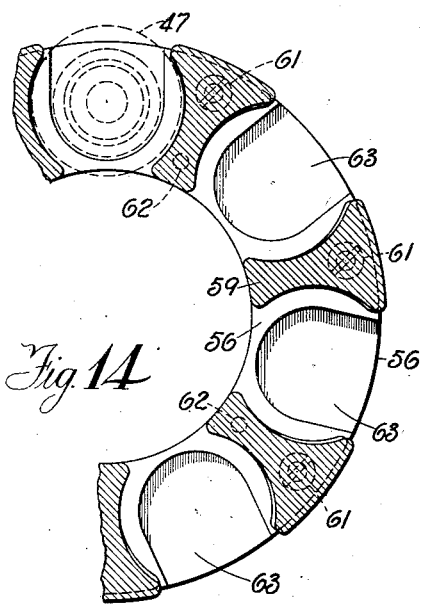
Figure 14 is a transverse sectional view through the drive end of the spider, looking toward the drive end.
Figure 15:
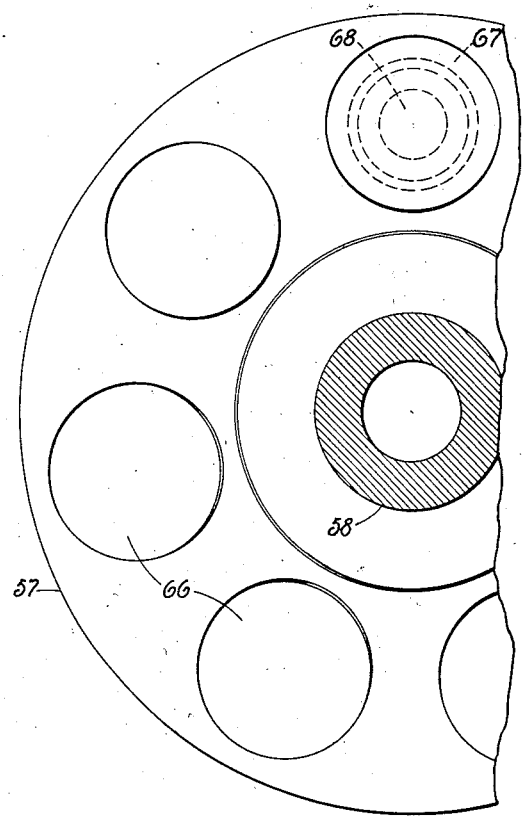
Figure 15 is a transverse sectional view through the driven end of the spider, looking toward the driven end.
Figure 16:
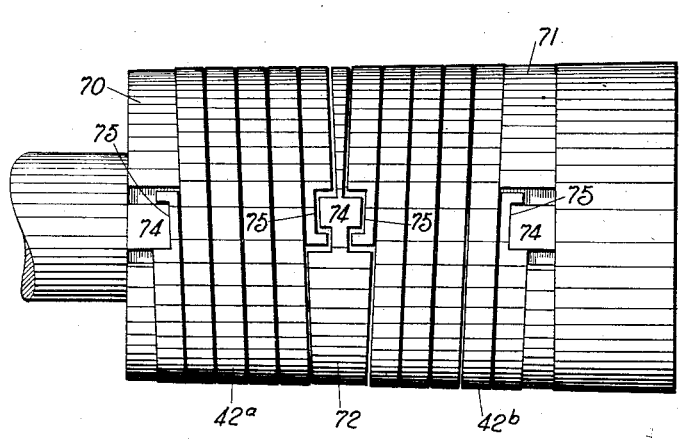
Figure 16 is a side elevational view of the driving spring assembly.

In order to translate the rotating motion of the rollers about their respective axes, into a planetary or orbital movement which may be used as a driving movement for the driven shaft, the control ring 44 (Fig. 17) is employed, which may be shifted back and forth along the rollers, as schematically illustrated in the arrangement in Figure 10, and as shown in Fig. 12.

The control ring 44 comprises a resilient helical ring or shoe 80 and a helical spring 81 surrounding and superimposed on the shoe, and an encircling and enclosing anchoring ring 82.

The control ring shown herein is adapted for bidirectional operation. The shoe and the spring are therefore constructed to co-operate for either direction of rotation of the transmission.

The shoe 80 is formed from a strip of steel having an initial shape as illustrated in Fig. 20, so that it will form a helical member when wound to proper diameter. The shoe embodies a central section 83 of full width with two tapered end pieces 84 and 85, respectively, whose outer edges 86 and 87 are in planes relatively perpendicular to an imaginary axis about which the ring is to be disposed, and whose inner edges 88 and 89 are in planes oblique to such axis. The oblique inner edges 88 and 89 extend from the outer edges of the tapered end pieces 84 and 85 to regions 91 and 92 on the central section 82 located short distances inwardly from the outer edges of the central section.

The edges on the under or inner surface of the strip directly beneath the two straight edges 86 and 87 may be beveled off to narrow the contact surface on the shoe where it engages the rollers when in operation as shown in Fig. 11 of the drawings.

When the strip is formed into desired shape, the two oblique edges are placed adjacent each other to form a helical member therefrom. The outer ends 94 and 95 are also bent upwardly to constitute end lugs to permit mechanical connections to be made to the helical member so formed.

The shoe when formed is shaped to have an internal cylindrical diameter corresponding to the diameter of the circular path described by, and constituting the locus of, the outer surfaces of the rollers in their planetary movements.

In order to provide resiliency in the control ring, the shoe is made of relatively resilient metal, although its smallest section must have sufficient strength to withstand the stresses set up by the load transmitted by the machine.

In order to provide strength and strangulating or gripping power to the shoe as a helical member around the rollers, the helical spring 81 is provided to function as a secondary source of gripping power behind and on the shoe. The spring 81 is formed of ribbon-shaped material wound on edge to occupy minimum space in width while providing a high degree of strength due to its depth and sectional area. With such construction, the width of contact between the shoe and the rollers may be kept relatively small.

The spring 81 is formed by winding the ribbon stock on edge. In order to provide a simple arrangement for establishing mechanical connections to the spring 81, its ends are bent back flatwise upon itself and welded in place to provide double thick terminals 97 and 98.

These terminals are then shaped to form notched end lugs 99 and 100 for engaging anchored plates 102 on the outer casing and enclosing ring 82. The notched end lugs 99 and 100 are formed on the outer peripheral edges of short extensions 104 and 105 extending tangentially from the circular portion of the spring. The inner peripheral edges of the extensions 104 and 105 are notched to form recesses 106 and 107 in the double-thick terminals 97 and 98 for receiving the lugs 94 and 95 respectively, at the ends of the helical shoe 80. The recesses should be so formed and positioned that the notched end lug at one end of the spring will engage its anchor plate while the recess at the other end of the spring will engage the associated lug on the shoe when tightening action takes place.

The spring should be able to move with a small amount of lost motion before the notched end lugs of the spring will engage the anchor plates 102, or before the lugs 94 and 95 on the shoe will be engaged by the end walls of the recesses 106 and 107.

For example, when the rotation of the rollers causes one end lug of the shoe to engage the end wall of its associated recess, tightening action will pull the adjoining notched end lug of the spring away from the associated anchor plate. At the other end, however, the shoe lug disengages the spring, but the notched spring end engages the associated anchor plate.

In order to compensate for the tightening action and for expansion due to temperature rise, small spaces 108 are provided between the end surfaces of the lugs on the shoe and the adjacent surfaces of the central section 83, as shown in Fig. 20.

The anchoring ring 82 is provided with two enlarged lateral bosses 111 and 112. The front boss 111 is hollowed to receive and support a pinion 113 which engages a rack 114 extending longitudinally of the transmission and suitably supported to serve as a means for controlling the movement of the control ring as a whole. The pinion is supported on a shaft 115 that is actuable by a hand-wheel 116 to move the control ring by the pinion and rack. The control ring is prevented from skewing by the rear boss 112 which rides upon a guide rod 117 supported behind and parallel to the rack. A locking clamp with a handle 118 serves to lock the control ring in any position where desired.

The construction of the driven ring 45 is similar to that of the control ring 44 except that the contact surface of the shoe is inclined to correspond to the inclination of the surfaces of the roller extensions 49, at an angle to meet at the vanishing point.

The driven shaft is shown supported in a radial bearing 125 and is provided with a thrust bearing 126. The driven shaft is also provided with an inward extension 127 which supports a radial bearing 128 and a thrust bearing 129 for the driven end of the spider, and extends into the inner end of the drive shaft where it is supported in a radial bearing 130. The extension also supports a radial bearing 131 for the drive end of the spider, and two end thrust bearings to separate the bearings 130 and 131 that rotate at different speeds.

The modification shown in Fig. 22 operates in accordance with the same principles governing the modification in Fig. 11, except that a gear drive assembly and a gear driven assembly are employed instead of springs. The control ring is employed in this modification as it is in the other modification.

As shown in Fig. 22, power is transmitted from a drive shaft 150 to a driven shaft 151 through a planetary system of tapered rollers 152. A sun gear 153 keyed to the drive shaft rotates the several rollers through planetary driving gears 154 co-axially mounted with the several rollers.

The rollers are respectively mounted upon shafts supported between bearings 155 and 156 mounted in a rigid spider 157. The spider is substantially of spool-shape and embodies a central hollow cylindrical shaft or shank 158 and two lateral end flanges 159 and 160. The bearings 155 and 156 are mounted in the end flanges 159 and 160 and support the rollers in such manner that the axes of the rollers and their shafts are inclined to the central axis and meet at a vanishing point that is the virtual apex for the conical pitch line circles of the sun gear 153 and the planetary driving gears 154.

The spider is suitably supported on two bearings 161 and 162 mounted on an extension 163 of the drive shaft because of the different speeds of rotation of the drive shaft and of the spider. The drive shaft extension is supported in a bearing 164 mounted in the end of the driven shaft.

The driven ends of the roller shafts support driven planetary gears 165 which engage an internal gear 166 secured to the driven shaft, and, for the sake of simplicity, shown as being integral therewith. The pitch line circles of the driven gears 165 and of the internal gear 166 also are inclined to meet at the vanishing point of the system, so that planetary movement of the spider and rollers will involve purely rolling actions.

A control ring of the type described on the other modification is supported on a screw to be moved along the rollers to vary the speed ratio as desired. As shown, the control ring embodies two side aprons or annular rings which engage the shoe and move it in the direction and to the extent desired.

The operation of this modification is similar to that of the first-described modification, except that gears are used at both ends of the ratio-changing rollers.

My invention is not limited therefore to the particular modifications illustrated, nor to the specific details of construction as shown, since these may be modified without departing from the spirit and scope of the invention as set forth in the appended claims.

I claim as my invention:

1. A variable speed mechanism comprising a driving member, a driven member, and means for transmitting motion between them comprising a plurality of planetary rollers rotated by the driving member, means responsive to planetary or orbital movement of the rollers for actuating the driven member and a resilient roller engaging annulus for controlling the orbital movement of the rollers.

2. A variable speed transmission comprising a drive shaft, a driven shaft, and means for transmitting motion between them, said means comprising a plurality of planetary rollers disposed in a space between the drive shaft and the driven shaft, the rollers being similarly tapered and disposed to have their outer longitudinal surfaces parallel, a helical spring associated with, and actuated by the drive shaft, for engaging the inner surfaces of the rollers at one end of the planetary assembly and for rotating the rollers, a helical resilient member encircling and engaging the outer surfaces of the rollers at the other end of the rollers and actuable by the rollers in accordance with the combined rotary and orbital movement of the rollers, and a resilient helical ring encircling and engaging the rollers and movable longitudinally thereon between the ends of the rollers, said ring serving to control the orbital movement of the rollers according to the ratio of the diameters of the rollers at the plane engaged by the ring and the diameter of the ring.

3. A variable speed transmission comprising a drive shaft, a helically wound resilient spring mounted thereon, a plurality of rollers respectively tapered from a plane adjacent one end to each end of the roller to provide a short tapered part and a long tapered part, the short tapered part of each roller engaging the spring whereby the rollers may be rotated, means supporting the rollers to present their outer longitudinal surfaces on the long tapered parts in parallel relationship in a cylindrical plane, a resilient helical ring encircling the rollers and closely engaging them along a relatively short distance, means for moving the ring along the rollers, and means including a helically wound spring encircling the ends of the rollers at the ends of the long tapered parts for transmitting the combined rotary and planetary movements of the rollers to the driven shaft.

4. A variable speed transmission comprising a drive shaft, a plurality of rollers disposed in planetary arrangement around said drive shaft and engaging the drive shaft to be rotated thereby, the rollers being similarly tapered from a large diameter to a small diameter and having an enlarged portion near the small end of the roller, said enlarged portion having a diameter of a value intermediate the large and the small diameters, a resilient helical member encircling the enlarged portions of the rollers to be actuated by said rollers according to the combined rotary and planetary movements of the rollers, and a control ring encircling and engaging the rollers and shiftable along them for controlling the planetary movements of the rollers.

5. A race for rollers consisting of a resilient helical member having a stressed helical spring mounted on the outside thereof to establish a tightening action on the resilient member.

6. A race for rollers comprising a resilient ring shaped to establish a helix, and a stressed helical spring mounted on the outer peripheral surface of the helical ring and wound in the opposite direction of the helix formed by the ring.

7. A race for rollers comprising a resilient helical member shaped in the form of a helix and having its inner surface cylindrical to serve as a raceway, a helical spring encircling said member and wound oppositely thereto, and means for anchoring one end of the spring on said member.

8. A variable speed mechanism comprising a driving member, a driven member, and means for transmitting motion between said members comprising a plurality of planetary rollers rotated by the driving member, means responsive to planetary or orbital movement of the rollers for actuating the driven member, and a resilient roller engaging annulus for controlling the orbital movement of the rollers, said annulus being adapted to exert a varying gripping action in response to varying load on said driven member.

9. A variable speed mechanism comprising a driving member, a driven member, means for transmitting motion between said members comprising a plurality of planetary rollers rotated by the driving member, and resilient load equalizing means for said members, said equalizing means engaging said rollers for controlling the orbital movement of the rollers.

AUGUST J. MOTTLAU.